(12) United States Patent
Kuhn et al.

(10) Patent No.: US 6,531,533 B1
(45) Date of Patent: *Mar. 11, 2003

(54) STABILIZED HALOGEN-CONTAINING POLYMERS

(75) Inventors: Karl Josef Kuhn, Lautertal (DE); Wolfgang Wehner, Ober-Ramstadt (DE); Rolf Drewes, Lindenfels (DE)

(73) Assignee: Crompton Vinyl Additives GmbH, Bergkamen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1190 days.

(21) Appl. No.: 08/799,174

(22) Filed: Feb. 12, 1997

Related U.S. Application Data

(63) Continuation of application No. 08/668,888, filed on Jun. 24, 1996, now abandoned.

(30) Foreign Application Priority Data

Jun. 30, 1995 (CH) .................................. 1932/95

(51) Int. Cl.$^7$ ............................. C08K 3/22; C08K 3/34; C08K 5/57; C08K 5/58
(52) U.S. Cl. ..................... 524/450; 524/399; 524/178; 524/179; 524/180; 524/181; 524/182
(58) Field of Search ..................... 524/450, 399, 524/397, 398, 400, 178, 180, 181, 182, 179

(56) References Cited

U.S. PATENT DOCUMENTS

| | | | | |
|---|---|---|---|---|
| 4,000,100 A | * | 12/1976 | Baldyga ..................... | 524/450 |
| 4,338,226 A | * | 7/1982 | Worschech et al. ......... | 524/450 |
| 4,371,656 A | * | 2/1983 | Kashiwase et al. ......... | 524/450 |
| 4,590,233 A | | 5/1986 | Erwied et al. ............... | 524/357 |
| 4,686,255 A | * | 8/1987 | Erweid et al. ............... | 524/450 |
| 5,004,776 A | * | 4/1991 | Tadenume et al. .......... | 524/436 |
| 5,141,980 A | * | 8/1992 | Ranceze et al. ............. | 524/450 |
| 5,216,058 A | * | 6/1993 | Visneski ...................... | 524/436 |
| 5,350,785 A | * | 9/1994 | Sander et al. ................ | 524/450 |
| 5,519,077 A | * | 5/1996 | Drewes et al. ............... | 524/450 |
| 5,534,566 A | * | 7/1996 | Wehner et al. ............... | 524/450 |

FOREIGN PATENT DOCUMENTS

| | | |
|---|---|---|
| EP | 0062813 | 10/1982 |
| EP | 0297538 | 1/1989 |
| EP | 0432495 | 6/1991 |
| EP | 0658594 | 6/1995 |

OTHER PUBLICATIONS

Derw. Abst. 89–297874.
Derw. Abst. 89–119527.
Chem. Abst. 111:175504.
Derwent Abstract, 80–01914C [02].
Derwent Abstract—80–01914C[02].
Derwent Abstract—89–297874.
Derwent Abstract—89–119527.
Chemical Abstract—111:175504.

\* cited by examiner

*Primary Examiner*—Peter Szekely
(74) *Attorney, Agent, or Firm*—Scully, Scott, Murphy & Presser

(57) ABSTRACT

Halogen-containing polymers or the recyclates thereof are stabilized by the addition of (a) a halogen-containing polymer or a recyclate thereof;
(b) at least one zeolite in the form of sodium, potasssium and/or lithium, in particular at least one zeolite of formula $$M_2O \cdot Al_2O_3 \cdot x\, SiO_2 \cdot y\, H_2O \qquad (I),$$

wherein M is Na, K or Li, x is 2 to 12, and y is 1 to 15, with the exception of zeolite A, $Na_{12}Al_{12}Si_{12}O_{48} \cdot 27\, H_2O$ and clinoptilolite $Na_6Al_6Si_{30}O_{72} \cdot 2\, H_2O$, (c) at least one organic zinc, aluminium or rare earth compound, and/or
(d) at least one organotin compound, as described in more detail in claim 1.

14 Claims, No Drawings

STABILIZED HALOGEN-CONTAINING POLYMERS

This application is a continuation of application Ser. No. 08/668,888, filed Jun. 24, 1996 now abandoned.

The present invention relates to stabilised halogen-containing polymers or recyclates thereof, preferably polyvinyl chloride (PVC) or recyclates thereof, and to a stabiliser mixture comprising specific zeolites, metal soaps and/or organotin compounds, as well as to a process for the preparation of stabilised halogen-containing polymers.

In addition to tin and lead compounds, PVC is also stabilised using fatty acid salts (so-called metal soaps), where the metals are usually barium, cadmium, zinc, magnesium, calcium or, once more, lead. In view of the different stabilisation properties (initial colour, colour retention and long-term stability), a combination of two different metals soaps, for example barium/cadmium soaps, is used to achieve a balanced stabilisation. In order to avoid the use of compounds containing barium, lead or cadmium, the use of calcium/zinc soaps has also been proposed; cf for example "Taschenbuch der Kunststoff-Additive", edited by R. Gächter and H. Müller, (hereinafter abbreviated to "KA'e G & M") Hanser Verlag, 3rd Edition, 1990, pages 308–309, and "Kunststoff Handbuch PVC", Volumes 1 and 2, Beck/Braun, Carl Hanser Verlag, 2nd Edition, 1985/1986.

It has also been proposed, inter alia, to use, as costabiliser for PVC, a compound of the series of the zeolites or hydrotalcites; examples are given in EP-A-0 062 813, EP-A-0 432 495, U.S. Pat. No. 5,216,058 as well as in U.S. Pat. No. 4,000,100, where the use of non-activated zeolite A is disclosed.

Efforts continue to provide physiologically acceptable stabiliser systems which at the same time are capable of providing high stabilisation. Stabiliser systems which are to be avoided in particular are those containing barium, lead or cadmium.

It has now been found that specific zeolites may be combined surprisingly well, in particular with metal soaps and/or organotin compounds such that a halogen-containing polymer is provided with excellent long-term stability while having good initial colour and colour retention. Surprisingly, PVC stabilised according to this invention has e.g. markedly enhanced transparency and colour retention as compared to PVC stabilised in conventional manner.

Accordingly, the invention relates to compositions comprising (a) a halogen-containing polymer or the recyclate thereof;
(b) at least one zeolite in the form of alkali, preferably in the form of sodium, potasssium and/or lithium, in particular at least one zeolite of formula $$M_2O.Al_2O_3.x\ SiO_2.y\ H_2O \tag{I}$$

wherein M is Na, K or Li, x is 2 to 12, and y is 1 to 15, preferably $Na_2O.Al_2O_3.(2\ to\ 5)SiO_2.(3.5\ to\ 10)\ H_2O$ (zeolite P or zeolite MAP or MA-P), with the exception of zeolite A, $Na_{12}Al_{12}Si_{12}O_{48}.27\ H_2O$ and clinoptilolite $Na_6Al_6Si_{30}O_{72}.2\ H_2O$, (c) at least one organic zinc, aluminium or rare earth compound, preferably at least one metal soap, and/or
(d) at least one organotin compound of one of the formulae I to VII

(I),

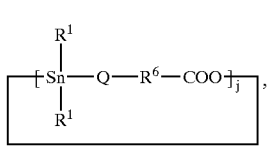

(II),

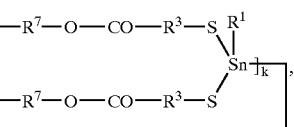

(III),

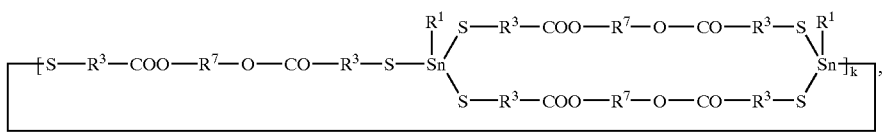

(IV),

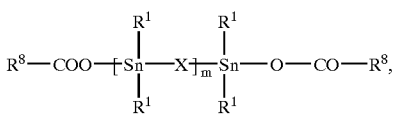

(V), $$R_pSnS_q \tag{VI}$$

and $$[R_pSnS_q]_r \tag{VII},$$

wherein
R and $R^1$ are each independently of the other $C_1$–$C_{12}$alkyl or $C_3$–$C_{11}$alkoxycarbonylethyl,
Q has the meaning of —S— or —O—CO—, and
$R^2$, if Q is —S—, is $C_8$–$C_{18}$alkyl or a —$R^3$—COO—$R^4$ or —$R^3$—O—CO—$R^4$ radical,
$R^2$, if Q is —O—CO—, is $C_1$–$C_{18}$alkyl, $C_2$–$C_{18}$alkenyl, phenyl, $C_1$–$C_4$alkyl-substituted phenyl, or a —CH=CH—COO—$R^5$ radical,
$R^3$ is methylene, ethylene or o-phenylene,
$R^4$ is $C_5$–$C_{18}$alkyl,
$R^5$ is $C_1$–$C_{18}$alkyl, $C_5$–$C_7$cycloalkyl or benzyl,
$R^6$, if Q is —S—, is methylene, ethylene or o-phenylene,
$R^6$, if Q is —O—CO—, is $C_1$–$C_8$alkylene, o-phenylene or a —CH=CH— group,
$R^7$ is $C_2$–$C_4$alkylene or $C_4$–$C_8$alkylene which is interrupted by —O—,
$R^8$ is $C_1$–$C_{18}$alkyl, $C_2$–$C_{18}$alkenyl, phenyl, $C_1$–$C_4$alkyl-substituted phenyl, or a —CH=CH—COO—$R^5$ radical, X independently has the meaning of —O— or —O—CO—R⁹—COO—, R⁹ is $C_1$–$C_8$alkylene, o-phenylene or a —CH=CH— group, p is 1 or 2, q is [(4–p)/2], and r>1, i is 1 or 2, j is a number in the range from 1 to 6, k is a number in the range from 1 to 3, and m is a number in the range from 1 to 4.

The abbreviated form —COO— used above, throughout the description and in the claims denotes the grouping

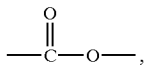

and —O—CO— denotes the grouping

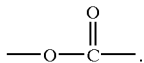

$R^1$, $R^2$, $R^4$, $R^5$ and $R^8$ defined as alkyl are, within the scope of the indicated number of carbon atoms, typically methyl, ethyl, propyl, isopropyl, butyl, isobutyl, tert-butyl, pentyl, hexyl, heptyl, octyl, isooctyl, nonyl, decyl, undecyl, dodecyl, tridecyl, tetradecyl, pentadecyl, hexadecyl, heptadecyl or octadecyl.

Isooctyl denotes the alkyl radicals of the mixture originating from the oxo process and consisting of primary branched alcohols R'CH₂OH, wherein R' is a branched heptyl group (Merck Index 10th Ed., 5041).

R defined as alkyl is preferably n- and isoalkyl radicals, particularly preferably methyl, ethyl and n-butyl.

$R^1$ defined as alkyl is preferably methyl, butyl or octyl. $R^1$ defined as $C_3$–$C_{11}$alkoxycarbonylethyl is $C_1$–$C_8$alkyl-O—CO—CH₂—CH₂—.

$R^2$ and $R^8$ defined as $C_2$–$C_{18}$alkenyl are, inter alia, ethenyl (vinyl), propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-heptadec-8-enyl, n-octadec-4-enyl.

$R^2$ and $R^8$ defined as $C_1$–$C_4$alkyl-substituted phenyl typically embraces methylphenyl, dimethylphenyl, trimethylphenyl, ethylphenyl, diethylphenyl, isopropylphenyl, tert-butylphenyl.

$R^2$, $R^6$, $R^8$ and $R^9$ defined as —CH=CH—COO—$R^5$ or —CH=CH— are derived from maleic acid or fumaric acid, preferably from maleic acid.

$R^5$ defined as $C_5$–$C_7$cycloalkyl ist cyclopentyl, cyclohexyl or cycloheptyl, preferably cyclopentyl or cyclohexyl and, most preferably, cyclohexyl.

$R^6$ and $R^7$ defined as alkylene is a divalent alkyl radical; within the scope of the indicated chain lengths $R^6$ and $R^7$ are typically methylene, ethylene, —CH(CH₃)—CH₂—, —(CH₂)₃—, —(CH₂)₄—, —(CH₂)₆—, —(CH₂)₈—, —CH₂—CH(C₂H₅)—(CH₂)₄—, —CH₂—C(CH₃)₂—CH₂—; straight-chain radicals being preferred. $R^7$ is $C_4$–$C_8$alkylene which is interrupted by —O—, typically —(CH₂)₂—O—(CH₂)₂—, —(CH₂)₃—O—(CH₂)₃—, —(CH₂)₂—O—(CH₂)₄— or —(CH₂)₄—O—(CH₂)₄—, preferably —(CH₂)₂—O—(CH₂)₂—. The unit (O—CH₂—CH₂) can also be present several times. Typical examples of such radicals are (CH₂)₂—(O—CH₂CH₂—)₂— and —(CH₂)₂—(O—CH₂CH₂—)₃.

Component (a)

Preferred halogen-containing polymers or their recyclates are those which contain chlorine, typically polymers of vinyl chloride and vinylidene chloride, vinyl resins containing vinyl chloride units in their structure, e.g. copolymers of vinyl chloride and vinyl esters of aliphatic acids, in particular vinyl acetate; copolymers of vinyl chloride with esters of acrylic and methacrylic acid and with acrylonitrile; copolymers of vinyl chloride with diene compounds and unsaturated dicarboxylic acids or anhydrides thereof, such as copolymers of vinyl chloride with diethyl maleate, diethyl fumarate or maleic anhydride; post-chlorinated polymers and copolymers of vinyl chloride; copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and alpha-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber hydrochloride and chlorinated rubber hydrochloride; and mixtures of said polymers with one another or with other polymerisable compounds.

Chlorine-containing polymers also include graft polymers of PVC with EVA, ABS and MBS. Preferred substrates are also mixtures of the above-mentioned homopolymers and copolymers, in particular vinyl chloride homopolymers, with other thermoplastic and/or elastomeric polymers, in particular blends with ABS, MBS, NBR, SAN, EVA, CPE, MBAS, PMA, PMMA, EPDM and polylactones.

Suspension, bulk and emulsion polymers are also preferred.

The chlorine-containing polymer is particularly preferably polyvinyl chloride, in particular suspension polymers and emulsion polymers.

Within the scope of this invention, PVC will also be understood to mean copolymers or graft polymers of PVC with polymerisable compounds, such as acrylonitrile, acrylates and methacrylates, vinyl acetate or ABS, which may be suspension, bulk or emulsion polymers. PVC homopolymer in combination with polyacrylates is also preferred.

Within the scope of this invention, (a) will also be understood to mean in particular recyclates of halogen-containing polymers, which are the polymers described above in more detail and which have suffered damage by processing, use or storage. PVC recyclate is particularly preferred. The recyclates may also contain minor amounts of foreign materials, typically paper, pigments, adhesives or other polymers, which are often difficult to remove. These foreign materials can also originate from contact with different substances during use or working up, for example fuel residues, paint components, metal traces, initiator residues or also water traces.

Component (b)

Zeolites which can be used according to the invention and falling under formula I are, inter alia, known from "Atlas of Zeolite Structure Types", W. M. Meier and D. H. Olson, Verlag butterworths, 3rd Edition, 1992. In formula I, M is preferably Na or K, x is 1 to 10, and y is 2 to 12.

The preferred zeolites have an average effective pore diameter of 3 to 9 Å and can be prepared according to known methods.

Such methods are described, inter alia, in U.S. Pat. Nos. 4,503,023; 4,000,100, 3,130,007, 3,008,803, EP-A40961, EP-A-384070, DE-A-26 20 293, GB-A-1 082 131, U.S. Pat. Nos. 2,950,952; 2,882,244, in G. H. Kühl, The American Mineralogist, 54, 1607–12 (1969) and in L.Puppe, Chemie in unserer Zeit 1986, 117 ff.

Zeolites of formula I which are of foliated or cubical crystal habit are also preferred.

Crystalline sodium aluminium silicates are likewise preferred, the particle size of which is at least predominantly in the range of <10μ.

Typical examples of suitable zeolites are:

$Na_8Al_8Si_{40}O_{96} \cdot 24\ H_2O$ [mordenite]

$Na_6Al_6Si_{30}O_{72} \cdot 24\ H_2O$, $Na_8Al_8Si_{40}O_{96} \cdot 24\ H_2O$, $Na_{16}Al_{16}Si_{24}O_{80} \cdot 16\ H_2O$, $Na_{16}Al_{16}Si_{32}O_{96} \cdot 16\ H_2O$, $Na_{56}Al_{56}Si_{136}O_{384} \cdot 250\ H_2O$ [zeolite Y], $Na_{86}Al_{86}Si_{106}O_{384} \cdot 264\ H_2O$ [zeolite X], $Na_2O \cdot Al_2O_3 \cdot (2\ \text{to}\ 5)\ SiO_2 \cdot (3.5\ \text{to}\ 10)\ H_2O$ [zeolite P], $Na_2O \cdot Al_2O_3 \cdot 2\ SiO_2 \cdot (3.5–10)H_2O$ (zeolite MAP)

or those zeolites which can be represented by the partial or complete replacement of the sodium atoms with lithium, potassium or hydrogen atoms, for example $(Li,Na,K,H)_{10}Al_{10}Si_{22}O_{64} \cdot 20\ H_2O$, $K_9Na_3[(AlO_2)_{12}(SiO_2)_{12}] \cdot 27\ H_2O$, $K_4Al_4Si_4O_{16} \cdot 6H_2O$ [zeolite K-F], $Na_8Al_8Si_{40}O_{96} \cdot 24\ H_2O$ zeolite D, as described in Barrer et al., J. Chem. Soc. 1952, 1561–71, and in U.S. Pat. No. 2,950,952;

The following zeolites are also suitable (if they can contain cations other than Li⁺, Na⁺ and K⁺, then those sodium, potassium and/or lithium forms will be meant here which are obtainable by conventional ion exchange):

potassium offretite, as disclosed in EP-A-400 961;

zeolite R, as disclosed in GB 841 812;

zeolite LZ-217, as disclosed in U.S. Pat. No. 4,503,023;

calcium-free zeolite LZ-218, as disclosed in U.S. Pat. No. 4,333,859;

zeolite T, zeolite LZ-220, as disclosed in U.S. Pat. No. 4,503,023;

$Na_3K_6Al_9Si_{27}O_{72} \cdot 21\ H_2O$ [zeolite L];

zeolite LZ-211, as disclosed in U.S. Pat. No. 4,503,023;

zeolite LZ-212, as disclosed in U.S. Pat. No. 4,503,023;

zeolite O, zeolite LZ-217, as disclosed in U.S. Pat. No. 4,503,023;

zeolite LZ-219, as disclosed in U.S. Pat. No. 4,503,023;

zeolite Rho, zeolite LZ-214, as disclosed in U.S. Pat. No. 4,503,023;

zeolite ZK-19, as described in Am. Mineral. 54 1607 (1969);

zeolite W (K-M), as described in Barrer et al. J. Chem. Soc. 1956, 2882,;

$Na_{30}Al_{30}Si_{66}O_{192} \cdot 98\ H_2O$ [zeolite ZK-5, zeolite Q].

It is particularly preferred to use zeolite P types of formula I, wherein x is 2 to 5, and y is 3.5 to 10 and, very particularly preferably, zeolite MAP of formula I, wherein x is 2 and y is 3.5 to 10. It is preferred to use zeolite Na-P, i.e. M is potassium. This zeolite usually occurs in the variants Na-P-1, Na-P-2 and Na-P-3, which differ in their cubical, tetragonal or orthorhombical structure (R. M. Barrer, B. M. Munday, J.Chem.Soc. A 1971, 2909–14). Said literature also gives a description of the preparation of zeolite P-1 and P-2. According to this literature, zeolite P-3 is very rare and therefore of hardly any interest in practice. The structure of zeolite P-1 corresponds to the structure of the gismondite known from the above-cited Atlas of Zeolite Structures. Recent literature (EP-A-384 070) makes a distinction between cubical (zeolite B or $P_c$) and tetragonal (zeolite $P_1$) zeolites of the P type and also mentions recent zeolites of the P type with Si:Al ratios below 1.07:1. These zeolites are termed MAP or MA-P for "maximum aluminium P". Depending on the process for the preparation of these zeolites, zeolite P can contain minor amounts of other zeolites. Very pure zeolite P has been described in WO 94/26662.

Within the scope of this invention it is also possible to use finely particulate water-insoluble sodium aluminium silicates which have been precipitated and crystallised in the presence of water-soluble inorganic or organic dispersants. They can be introduced into the reaction mixture in any manner before or during the precipitation or crystallisation.

The zeolites can be used in amounts of typically 0.1 to 20, conveniently of 0.1 to 10 and, preferably, of 0.1 to 5 parts by weight, based on 100 parts by weight of PVC.

Component (c), Metal Soaps

In this connection, metal soaps are organic zinc, magnesium, aluminium or lanthanoid compounds of the series of the aliphatic saturated $C_2$–$C_{22}$carboxylates, the aliphatic unsaturated $C_3$–$C_{22}$carboxylates, the aliphatic $C_2$–$C_{22}$carboxylates which are substituted by at least one OH group, or the chain of which is interrupted by at least one O atom (oxa acids), the cyclic and bicyclic carboxylates containing 5–22 carbon atoms, the phenylcarboxylates which are unsubstituted, substituted by at least one OH group and/or substituted by $C_1$–$C_{16}$alkyl, the naphthylcarboxylates which are unsubstituted, substituted by at least one OH group and/or substituted by $C_1$–$C_{16}$alkyl, the phenyl-$C_1$–$C_{16}$-alkylcarboxylates, the naphthyl-$C_1$–$C_{16}$alkylcarboxylates, or the phenolates which are unsubstituted or substituted by $C_1$–$C_{12}$alkyl.

To be mentioned by name are, for example, the zinc salts of the monovalent carboxylic acid, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristic acid, palmitic acid, lauric acid, isostearic acid, stearic acid, 12-hydroxystearic acid, 9,10-dihydroxy-stearic acid, oleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid; zinc salts of the divalent carboxylic acids or the monoesters thereof, such as oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, oxalic acid, salicylic acid, polyglycol dicarboxylic acid (n=10–12), phthalic acid, isophthalic acid, terephthalic acid and hydroxyphthalic acid; and the diester or triester of the tri- or tetravalent carboxylic acids, such as hemimellitic acid, trimellitic acid, pyromellitic acid, citric acid as well as zinc salts of mono- or diesterified phosphoric acid or of monoesterified phosphorous acid, as disclosed in JP 3 275 570; and also colophonic acids (rosin acids such as abietic acid) as well as so-called overbased zinc carboxylates.

Preferred compositions are those, as described above, wherein (c) is an organic zinc compound, in particular an organic zinc carboxylate of a carboxylic acid containing 7 to 25 carbon atoms (zinc soaps), typically benzoates or alkanoates, preferably $C_8$alkanoates, stearate, oleate, laurate, palmitate, behenate, versatate, hydroxy stearates, dihydroxy stearates, p-tert-butylbenzoate, or (iso)octanoate. Stearate, oleate, versatate, benzoate, p-tert-butylbenzoate and 2-ethylhexanoate are particularly preferred.

In addition to the cited zinc compounds, component (c) can also be organic aluminium compounds to which the same specifications apply as those made above for the zinc compounds. Further details concerning the aluminium compounds which can be used and which are preferred are given in U.S. Pat. No. 4,060,512.

In addition to the cited zinc compounds, component (c) may also suitably be organic rare earth compounds, to which the same specifications apply as those made above for the zinc compounds. The term rare earth compound in this connection will be taken to mean mainly compounds of the elements cerium, praseodymium, neodymium, samarium, europium, gadolinium, terbium, dysprosium, holmium, erbium, thulium, ytterbium, lutetium, lanthanum and yttrium. Mixtures with, in particular, cerium are preferred. Further preferred rare earth compounds are given in EP-A-0 108 023.

It is also possible to use a mixture of zinc, aluminium, lanthanum or lanthanoid compounds of different structure. Organic zinc, aluminium, lanthanum or lanthanoid compounds can also be coated on an aluminium salt compound of formula (I); cf. also DE-A-40 31 818.

The metal soaps or the mixtures thereof described above can be used in amounts of typically 0.001 to 10, conveniently of 0.01 to 5, preferably of 0.01 to 3 parts by weight, based on 100 parts by weight of halogen-containing polymer.

Component (d), Organotin Compounds

The organotin compounds of formulae I to VII are known (see, for example, the references cited at the outset as well as U.S. Pat. No. 5,021,491 and references therein: U.S. Pat. Nos. 2,731,482, 2,731,484, 2,713,585, 2,648,650, 3,507,827). Said organotin compounds may in particular be carboxylates, mercaptides and sulfides.

Typical mercaptides are: methyl tin tris (alkylthioglycolate) or methyl tin tris (alkylthiopropionate), n-butyl tin tris (alkylthioglycolate), n-butoxycarbonylethyl tin tris (alkylthioglycolate), dimethyl tin bis (alkylthioglycolate) or dimethyl tin bis (alkylthiopropionate); di-n-butyl tin bis (alkylthioglycolate) or di-n-butyl tin bis (alkylthiopropionate); bis-n-(butoxycarbonylethyl) tin (alkylthioglycolate) as well as n-octyl tin tris (isooctylthioglycolate).

Typical sulfides of formulae VI and VII are

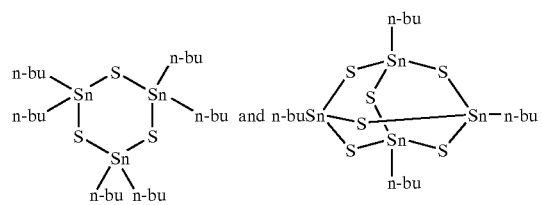

Typical carboxylates are di-n-butyl tin bis (methylmaleate), di-n-butyl tin bis(butylmaleate) and polymeric di-n-butyl tin maleate. The carboxylates can also be mixtures, typically the mixture consisting of 40% by weight of the

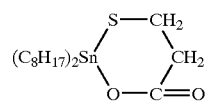

compound and 60% by weight of the

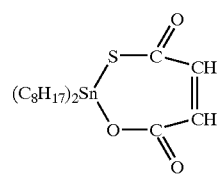

compound; or the mixture consisting of 66.7% by weight of the

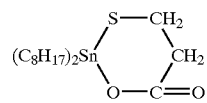

compound and 33.3% by weight of the

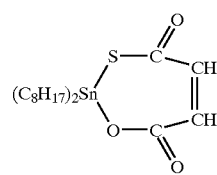

compound.

In addition to the compounds of component (d) of formulae I to VII, further tin stabilisers may also be present in the novel compositions, provided they do not adversely affect the improved properties achieved by said compounds, However, preference is given to those novel compositions which contain no further tin stabilisers in addition to the above-described organotin compounds of component (d) and the comproportionation products thereof.

As is known from the chemistry of organotin stabilisers, the latter are often present in the stabilised substrate in a form other than that in which they were added. Reaction (comproprionation) products are usually formed. The invention naturally also relates to the use of compositions containing such products formed from the compounds of component (d), corresponding to formulae I to VII.

Component (d) in the compositions of this invention preferably is a mixture of compounds. However, the invention also relates to compositions having the same advantageous properties, wherein component (d) consists of only one compound.

If the compositions of this invention comprise as compounds of component (d) compounds of formulae I to V, then those are preferred, wherein $R^1$ is $C_1$–$C_{12}$alkyl, $R^2$, if Q is —S—, is $C_8$–$C_{18}$alkyl or a —$R^3$—COO—$R^4$ radical, $R^2$, if Q is —O—CO—, is $C_7$–$C_{18}$alkyl, $C_8$–$C_{18}$alkenyl, phenyl, or a —CH=CH—COO—$R^5$ radical, $R^3$ is methylene, ethylene or o-phenylene, $R^4$ is $C_5$–$C_{18}$alkyl, $R^5$ is $C_1$–$C_{18}$alkyl or $C_5$–$C_7$cycloalkyl, $R^6$, if Q is —S—, is methylene, ethylene or o-phenylene, $R^6$, if Q is —O—CO—, is $C_1$–$C_4$alkylene, o-phenylene or a —CH=CH— group, $R^7$ is $C_2$–$C_4$alkylene or $C_4$–$C_8$alkylene which is interrupted by —O—, $R^8$ is $C_1$–$C_{18}$alkyl, $C_2$–$C_{18}$alkenyl, phenyl, or a —CH=CH—COO—$R^5$ radical, $R^9$ is butylene, o-phenylene or a —CH=CH— group, i is 1 or 2, j is a number in the range from 1 to 6, k is a number in the range from 1 to 3, and m is a number in the range from 1 to 4.

In the compounds of formulae I to V those are particularly preferred wherein $R^1$ is $C_3$–$C_9$alkyl, $R^2$, if Q is —S—, is a —$R^3$—COO—$R^4$ radical, $R^2$, if Q is —O—CO—, is $C_7$–$C_{11}$alkyl or a —CH=CH—COO—$R^5$ radical, $R^3$ is methylene or ethylene, $R^4$ is $C_8$–$C_{18}$alkyl, $R^5$ is $C_1$–$C_8$alkyl or cyclohexyl, $R^6$, if Q is —S—, is methylene or ethylene, $R^6$, if Q is —O—CO—, is a —CH=CH— group, $R^7$ is —$C_2H_4$—, $R^8$ is $C_8$–$C_{12}$alkyl or a —CH=CH—COO—$R^5$ radical, $R^9$ is a —CH=CH— group, i is 1 or 2, j is a number in the range from 1 to 6, k is a number in the range from 1 to 3, and m is a number in the range from 1 to 4.

The substituents at the cited —CH=CH— groupings are particularly preferably cis-positioned (Z-configurated) and are derived in the compounds from maleic acid.

Also particularly preferred are compounds containing as component (d) at least one compound of formula I or III, wherein $R^1$ is butyl or octyl, $R^3$ is —$CH_2$—, $R^7$ is —$C_2H_4$—, in the case of Q=S: $R^2$ is —$CH_2$—COO—$R^4$ and $R^4$ is $C_8$–$C_{12}$alkyl, and in the case of Q=O—CO: $R^2$ is —CH=CH—COO—$R^5$ and $R^5$ is $C_1$–$C_{18}$alkyl.

The compositions preferably contain no lead compounds or cadmium compounds.

Depending on their end use requirement, the compositions can contain further additives and stabilisers, typically potassium, sodium, calcium, magnesium and barium soaps as well as, inter alia, plasticisers, epoxide compounds, perchlorates and lubricants. Suitable costabilisers are typically potassium, sodium, calcium, magnesium or barium soaps of the organic acids cited above under "metal soaps".

Suitable Plasticisers

Suitable organic plasticisers are, for example, those of the following groups:

A) Phthalates (phthalic acid esters)

Typical examples of such plasticisers are dimethyl phthalate, diethyl phthalate, dibutyl phthalate, dihexyl phthalate, di-2-ethylhexyl phthalate, di-n-octyl phthalate, di-isooctyl phthalate, diisononyl phthalate, di-isodecyl phthalate, di-isotridecyl phthalate, dicyclohexyl phthalate, di-methylcyclohexyl phthalate, dimethyl glycol phthalate, dibutyl glycol phthalate, benzylbutyl phthalate and diphenyl phthalate as well as mixtures of phthalates, such as $C_7$–$C_9$alkyl phthalate and $C_9$–$C_{11}$alkyl phthalate from predominantly linear alcohols, $C_6$–$C_{10}$-n-alkyl phthalates and $C_8$–$C_{10}$-n-alkyl phthalates. Preferred among these are dibutyl phthalate, dihexyl phthalate, di-2-ethylhexyl phthalate, di-n-octyl phthalate, di-iso-octyl phthalate, di-isononyl phthalate, di-isodecyl phthalate, di-isotridecyl phthalate and benzylbutyl phthalate as well as the cited mixtures of alkyl phthalates. Di-2-ethylhexyl, di-isononyl and di-isodecyl phthalate are particularly preferred.

Conventional abbreviations are: DOP (dioctyl phthalate, di-2-ethylhexyl phthalate), DINP (diisononyl phthalate), DIDP (diisodecyl phthalate).

B) Esters of aliphatic dicarboxylic acids, in particular esters of adipic acid, azelaic acid and sebacic acid Typical examples of such plasticisers are di-2-ethylhexyl adipate, di-isooctyl adipate (mixture), di-isononyl adipate (mixture), di-isodecyl adipate (mixture), benzylbutyl adipate, benzyloctyl adipate, di-2-ethylhexyl azelate, di-2-ethylhexyl sebacate and di-isodecylsebacate (mixture). Di-2-ethylhexyl adipate and di-isooctyl adipate are preferred.

C) Esters of tricarboxylic acids, typically citrate, in particular trimellitate, such as tri-2-ethylhexyl trimellitate, tri-isodecyl trimellitate (mixture), tri-isotridecyl trimellitate, tri-iso-octyl trimellitate (mixture) as well as tri-$C_6$–$C_8$alkyl, tri-$C_6$–$C_{10}$alkyl trimellitate, tri-$C_7$–$C_9$alkyl trimellitate and tri-$C_9$–$C_{11}$alkyl trimellitate. The latter trimellitates are obtained by esterifying the trimellitic acid with the corresponding alkanol mixtures. Preferred trimellitates are tri-2-ethylhexyl trimellitate and the cited trimellitates obtained from alkanol mixtures, in particular from $C_6$–$C_{12}$alkanol mixtures. Conventional abbreviations are: TOTM (trioctyl trimellitate, tri-2-ethylhexyl trimellitate), TIDTM (tri-isodecyl trimellitate) and TITDTM (triisotridecyl trimellitate).

D) Epoxide plasticisers

In addition to synthetic compounds, epoxidised oils and the esters thereof from natural sources are suitable, in particular epoxidised vegetable or animal oils, typically palm nut oil, palm oil, olive oil, beet oil, rape seed oil, linseed oil, ground nut oil, soybean oil, cotton seed oil, sunflower oil, pumpkin seed oil, coconut oil, corn oil, castor oil, walnut oil, fish oil, (bovine) tallow and mixtures thereof as well as esters thereof. Further examples are epoxidised polybutadiene, methylbutyl epoxy stearate or 2-ethylhexyl epoxy stearate, tris(epoxypropyl)isocyanurate, 3-(2-phenoxy)-1,2-epoxypropane, polyglycidyl ether of bisphenol A, vinylcyclohexene diepoxide, dicyclopentadiene diepoxide and 3,4-epoxycyclohexylmethyl-3,4-epoxycyclohexanecarboxylate.

Epoxidised soybean oil, castor oil or linseed oil, or epoxidised butyl oleate, are often used, e.g. Irgaplast® 38, 39 and 392.

E) Polymer plasticisers

A definition of these plasticisers and typical examples thereof are given in "Plastics Additives", edited by R. G ächter and H. Müller, Hanser Verlag, 1990, page 393, chapter 5.9.6, and also in "PVC Technology", edited by W. V. Titow, 4th Ed., Elsevier Publ., 1984, pages 165–170. The most usual starting materials for the preparation of the polyester plasticisers are: dicarboxylic acids, typically adipic acid, phthalic acid, azelaic acid and sebacic acid; diols, such as 1,2-propanediol, 1,3-butanediol, 1,4-butanediol, 1,6-hexanediol, neopentyl glycol and diethylene glycol; monocarboxylic acids such as acetic acid, caproic acid, caprylic acid, lauric acid, myristic acid, palmitic acid, stearic acid, pelargonic acid and benzoic acid; monofunctional alcohols, typically isooctanol, 2-ethylhexanol, isodecanol as well as mixtures of $C_7$–$C_9$alkanol and $C_9$–$C_{11}$alkanol. Particularly advantageous polyester plasticisers are those obtained from the cited dicarboxylic acids and monofunctional alcohols.

F) Phosphates

A definition of these esters is given in the above-mentioned "Plastics Additives" on page 390, chapter 5.9.5. Typical examples of such phosphates are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Tri-2-ethylhexyl phosphate as well as ®Reofos 50 and 95 are preferred.

G) Chlorinated hydrocarbons (chlorinated paraffins)

H) Hydrocarbons (paraffins)

I) Monoester, typically butyl oleate, phenoxyethyl oleate, tetrahydrofurfuryl oleate, glycerol monooleate and glycerol monostearate as well as alkylsulfonate.

J) Glycol esters, typically diglycol benzoates.

Definitions and illustrative examples of plasticisers of groups G) to J) are given in the following handbooks:

"Plastics Additives", edited by R. Gächter and H. Müller, Hanser Verdag, 1990, page 284, chapter 5.9.14.2 (group G)),; and chapter 5.9.14.1 (group H)).

"PVC Technology", edited by W. V. Titow, 4th Ed., Elsevier Publishers, 1984, pages 171–173, chapter 6.10.2 (group G)), page 174, chapter 6.10.5 (group H)), page 173, chapter 6.10.3 (group I)) and pages 173–174, chapter 6.10.4 (group J)).

Particularly preferred plasticisers are those of groups A) to G), more particularly of groups A) to F), and especially those plasticisers which have been indicated as being preferred.

The plasticiers of groups A), B), C) and E) are usually present in an amount of 5 to 120, preferably of 10 to 100, parts, those of group D) are present in an amount of 0.5 to 30, preferably of 0.5 to 20 parts, those of group F) or G) in an amount of 1 to 100, preferably of 2 to 80 parts. It is also possible to use mixtures of different plasticisers.

The plasticisers may be used in amounts of typically 5 to 200, conveniently of 10 to 100 and, preferably, of 10 to 70 parts by weight, based on 100 parts by weight of PVC.

Plasticised PVC can be used to prepare, for example, wire sheaths, cable insulations, roof sheeting, decorative films, foams, agricultural sheeting, office films, automotive films (also those foam-backed with polyurethane), tubes, sealing profiles, (foamed) vinyl wall coverings, flooring and the like.

Epoxide Compounds

The epoxide compounds which can be used within the scope of this invention may be terminal or in middle position. The terminal epoxide compounds may have an aliphatic, aromatic, cycloaliphatic, araliphatic or heterocyclic structure and contain epoxide groups as side groups. The epoxide groups are preferably linked to the residual molecule as glycidyl groups through ether or ester bonds, or they are N-glycidyl derivatives of heterocyclic amines, amides or imides. Epoxide compounds of these types are commonly known and commercially available.

The epoxide compounds contain at least one epoxide radical of formula

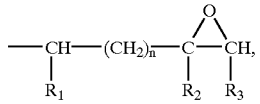

wherein $R_1$ and $R_2$ are both hydrogen, $R_3$ is hydrogen or methyl, and n=0, or wherein $R_1$ and $R_3$ together are —$CH_2$—$CH_2$— or —$CH_2$—$CH_2$—$CH_2$— and $R_2$ is then hydrogen, and n=0 or 1, and this epoxide radical is linked direct to carbon, oxygen, nitrogen or sulfur atoms.

Illustrative examples of epoxy resins are:

I) Glycidyl and β-methylglycidyl esters which are obtainable by reacting a compound containing at least one carboxyl group in the molecule and epichlorohydrin or glycerol dichlorohydrin or β-methyl epichlorohydrin. The reaction is conveniently carried out in the presence of a base.

Compounds containing at least one carboxyl group in the molecule may suitably be aliphatic carboxylic acids. Exemplary of these carboxylic acids are glutaric acid, adipic acid, pimelic acid, suberic acid, azelaic acid, sebacic acid or dimerised or trimerised linoleic acid, acrylic acid and methacrylic acid, hexanoic acid, caprylic acid, lauric acid, myristic acid, palmitic acid, stearic acid and pelargonic acid, as well as the acids mentioned under the organic zinc compounds.

However, cycloaliphatic carboxylic acids can also be used, for example cyclohexanecarboxylic acid, tetrahydrophthalic acid, 4-methyltetrahydrophthalic acid, hexahydrophthalic acid or 4-methylhexahydrophthalic acid.

Aromatic carboxylic acids may also be used, including benzoic acid, phthalic acid, trimellitic acid or pyromellitic acid.

Carboxyl-terminated adducts can also be used, typically those of trimellitic acid and polyols, such as glycerol or 2,2-bis(4-hydroxycyclohexyl)propane.

Further epoxide compounds which can be used within the scope of this invention are given in EP 0 506 617.

II) Glycidyl or (β-methylglycidyl) ethers obtainable by reacting a compound containing at least one free alcoholic hydroxyl group and/or phenolic hydroxyl group with a suitably substituted epichlorohydrin under alkaline conditions or in the presence of an acid catalyst and subsequent treatment with an alkali.

Ethers of this type are typically derived from acyclic alcohols such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, sorbitol, as well as from polyepichlorohydrins, butanol, amyl alcohol, pentanol, and also from monofunctional alcohols such as isooctanol, 2-ethylhexanol, isodecanol and mixtures of $C_7$–$C_9$alkanol and $C_9$–$C_{11}$alkanol.

However, they may also be derived from e.g. cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)cyclohex-3-ene, or they contain aromatic nuclei, such as N,N-bis(2-hydroxyethyl)aniline or p,p'-bis(2-hydroxyethylamino)diphenylmethane.

The epoxide compounds may also be derived from mononuclear phenols, as from phenol, resorcinol or hydroquinone; or they are based on polynuclear phenols such as bis(4-hydroxyphenyl)methane, 2,2-bis(4-hydroxyphenyl)propane, 2,2-bis(3,5-di-bromo-4-hydroxyphenyl)propane, 4,4'-dihydroxydiphenylsulfone, or on condensates of phenols with formaldehyde which are obtained under acid conditions, for example phenol novolaks.

Other possible terminal epoxides are, for example: glycidyl-1-naphthyl ether, glycidyl-2-phenylphenyl ether, 2-biphenyl glycidyl ether, N-(2,3-epoxypropyl)phthalimide and 2,3-epoxypropyl-4-methoxyphenyl ether.

III) (N-Glycidyl) compounds, obtainable by dehydrochlorination of the reaction products of epichlorohydrin with amines which contain at least one active hydrogen bound to amino nitrogen atoms. These amines are typically aniline, N-methylaniline, toluidine, n-butylamine, bis(4-aminophenyl)methane, m-xylylenediamine or bis(4-methylaminophenyl)methane, but also N,N,O-triglycidyl-m-aminophenol or N,N,O-triglycidyl-p-aminophenol.

The (N-glycidyl) compounds, however, also include N,N'-di-, N,N',N''-tri- and N,N',N'',N'''-tetraglycidyl derivatives of cycloalkylene ureas such as ethylene urea or 1,3-propylene urea, and N,N-diglycidyl derivatives of hydantoins, typically of 5,5-dimethylhydantoin or glycoluril and triglycidylisocyanurate.

IV) S-Glycidyl compounds, typically di-S-glycidyl derivatives that are derived from dithiols such as ethane-1,2-dithiol or bis(4-mercaptomethylphenyl) ether.

V) Epoxide compounds containing a radical of formula I, wherein $R_1$ and $R_3$ together are —$CH_2$—$CH_2$—, and n is 0, are bis(2,3-epoxycyclopentyl) ether, 2,3-epoxycyclopentylglycidyl ether or 1,2-bis(2,3-epoxycyclopentyloxy)ethane. An epoxy resin containing a radical of formula I, wherein $R_1$ and $R_3$ together are —$CH_2$—$CH_2$—, and n is 1, is typically methyl 3',4'-epoxy-6'-methylcyclohexyl-3,4-epoxy-6-methylcyclohexanecarboxylate.

Suitable terminal epoxides are typically:
a) liquid diglycidyl ethers of bisphenol A, e.g. Araldit®GY 240, Araldit®RGY 250, Araldit®GY 260, Araldit®GY 266, Araldit®GY 2600, Araldit®MY 790;
b) solid diglycidyl ethers of bisphenol A, e.g. Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610;
c) liquid diglycidyl ethers of bisphenol F, e.g. Araldit®GY 281, Araldit®PY 302, Araldit®PY 306;
d) solid polyglycidyl ethers of tetraphenylethane, e.g. CG Epoxy Resin®0163;
e) solid and liquid polyglycidyl ethers of phenolformaldehyde novolak, e.g. EPN 1138, EPN 1139, GY 1180, PY 307;
f) solid and liquid polyglycidyl ethers of o-cresolformaldehyde novolak, e.g. ECN 1235, ECN 1273, ECN 1280, ECN 1299;
g) liquid glycidyl ethers of alcohols, e.g. Shell® Glycidylether 162, Araldit®DY 0390, Araldit®DY 0391;
h) liquid glycidyl ethers of carboxylic acids, e.g. Shell®Cardura E terephthalate, trimellitate, Araldit®PY 284;
i) solid heterocyclic epoxy resins (triglycidylisocyanurate), e.g. Araldit® PT 810;
j) liquid cycloaliphatic epoxy resins, e.g. Araldit®CY 179;
k) liquid N,N,O-triglycidyl ethers of p-aminophenol, e.g. Araldit®MY 0510;
l) tetraglycidyl-4-4'-methylenebenzamine or N,N,N'N'-tetraglycidyldiaminophenylmethane, e.g. Araldit®MY 720, Araldit®MY 721.

It is preferred to use epoxide compounds having two functional groups. However, it is in principle also possible to use epoxide compounds having one functional group or three or more functional groups.

Epoxide compounds, in particular diglycidyl compounds, with aromatic groups are mainly used.

It is also possible to use a mixture of different epoxide compounds.

Terminal epoxide compounds are particularly preferably diglycidyl ether based on bisphenols, typically based on 2,2-bis(4-hydroxyphenyl)propane (bisphenol A), bis(4-hydroxyphenyl)methane or mixtures of bis(ortho/parahydroxyphenyl)methane (bisphenol F).

The epoxide compounds can be used in amounts of preferably at least 0.1, typically of 0.1 to 50, conveniently of 1 to 30 and, in particular, of 1 to 25 parts by weight, based on 100 parts by weight of PVC.

Perchlorates

The perchlorates (or perchloric acid) correspond to formula $M(ClO_4)_n$, wherein $M^+$ is $H^+$, $NH_4^+$, $Na^+$, $K^+$, $Mg^{2+}$, $Ca^{2+}$, $Ba^{2+}$ $Zn^{2+}$ or $Al^{3+}$. The index n is, in accordance with the valency of M, 1, 2 or 3.

The perchloric acid or the respective perchlorate can be used in different customary dosage forms; typically as salt or aqueous solution, as well as applied to a carrier, such as PVC, calcium silicate, zeolites or hydrotalcites, or intergrated into a hydrotalcite by chemical reaction or dissolved in liquid base components, typically butyl carbitol or polypropylene glycol.

They can also be used in amounts of typically 0.001 to 5, conveniently of 0.01 to 3, particularly preferably of 0.01 to 2.0 parts by weight, based on 100 parts by weight of PVC.

The halogen-containing stabilised polymer of this invention can contain further additives. These further additives are typically fillers and reinforcing agents (for example calcium carbonate, silicates, glass fibres, talcum, kaolin, chalk, mica, metal oxides and metal hydroxides, carbon black or graphite), antioxidants, polyols, dawsonites, hydrotalcites, organic phosphates, 1,3-diketo compounds, mono-, oligo- or polymeric dihydropyridines, α-phenylindole, pyrroles, β-naphthols, hydroxydiphenylamines, sterically hindered amines (HALS), light stabilisers, UV absorbers, lubricants, fatty acid esters, paraffins, blowing agents, fluorescent whitening agents, pigments, flame retardants, antistatic agents, β-aminocrotonates (e.g. those mentioned in EP 0 465 405, p. 6, 1. 9–14), phosphates, thiophosphates, gelling assistants, peroxide scavenging compounds, modifiers and further sequestrants for Lewis acids.

Fillers

The fillers used are, for example, chalk, kaolin, China clay, talcum, silicates, glass fibres, glass beads, wood flour, mica, metal oxides or metal hydroxides, carbon black, graphite, powdered stone, barite. Talcum and chalk are preferred.

The fillers can be used in amounts of preferably at least 1, typically of 5 to 200, conveniently of 10 to 150 and, in particular, of 15 to 100 parts by weight, based on 100 parts by weight of PVC.

β-Diketones 1,3-dicarbonyl compounds which can be used may be linear or cyclic dicarbonyl compounds. It is preferred to use dicarbonyl compounds of formula

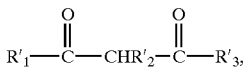

wherein $R'_1$ is $C_1-C_{22}$alkyl, $C_5-C_{10}$hydroxyalkyl, $C_2-C_{18}$alkenyl, phenyl, phenyl which is substituted by OH, $C_1-C_4$alkyl, $C_1-C_4$alkoxy or halogen, $C_7-C_{10}$phenylalkyl, $C_5-C_{12}$cycloalkyl, $C_1-C_4$alkyl-substituted $C_5-C_{12}$cycloalkyl, or a $-R_5-S-R_6$ or $-R_5-O-R_6$ group, $R'_2$ is hydrogen, $C_1-C_8$alkyl, $C_2-C_{12}$alkenyl, phenyl, $C_7-C_{12}$alkylphenyl, $C_7-C_{10}$phenylalkyl or a $-CO-R_4$ group, $R'_3$ has one of the meanings cited for $R'_1$ or is $C_1-C_{18}$alkoxy, $R_4$ is $C_1-C_4$alkyl or phenyl, $R_5$ is $C_1-C_{10}$alkylene, and $R_6$ is $C_1-C_{12}$alkyl, phenyl, $C_7-C_{18}$alkylphenyl or $C_7-C_{10}$phenylalkyl.

The β-diketones include the hydroxyl group-containing diketones of EP-A-346 279 and the oxa diketones and thia diketones of EP-A-307 358 as well as the isocyanuric acid-based β-keto esters of U.S. Pat. No. 4,339,383.

$R'_1$ and $R'_3$ defined as alkyl can in particular be $C_1-C_{18}$alkyl, typically methyl, ethyl, n-propyl, isopropyl, n-butyl,tert-butyl, pentyl, hexyl, heptyl, octyl, decyl, dodecyl or octadecyl.

$R'_1$ and $R'_3$ defined as hydroxyalkyl are in particular a $-(CH_2)_n-OH$ group, wherein n is 5, 6 or 7.

$R'_1$ and $R'_3$ defined as alkenyl can be, for example, vinyl, allyl, methallyl, 1-butenyl, 1-hexenyl or oleyl. Allyl is preferred.

$R'_1$ and $R'_3$ defined as phenyl which is substituted by OH, alkyl, alkoxy or halogen can be, for example, tolyl, xylyl, tert-butylphenyl, methoxyphenyl, ethoxyphenyl, hydroxyphenyl, chlorophenyl or dichlorophenyl.

$R'_1$ and $R'_3$ defined as phenylalkyl are in particular benzyl. $R'_2$ and $R'_3$ defined as cycloalkyl or alkylcycloalkyl are in particular cyclohexyl or methylcyclohexyl.

$R'_2$ defined as alkyl can be in particular $C_1-C_4$alkyl. $R'_2$ defined as $C_2-C_{12}$alkenyl can be in particular allyl. $R'_2$ defined as alkylphenyl can be in particular tolyl. $R'_2$ defined as phenylalkyl can be in particular benzyl. $R'_2$ is preferably hydrogen. $R'_3$ defined as alkoxy can be, for example, methoxy, ethoxy, butoxy, hexyloxy, octyloxy, dodecyloxy, tridecyloxy, tetradecyloxy or octadecyloxy. $R_5$ defined as $C_1-C_{10}$alkylene is in particular $C_2-C_4$alkylene. $R_6$ defined as alkyl is in particular $C_4-C_{12}$alkyl, typically butyl, hexyl, octyl, decyl or dodecyl. $R_6$ defined as alkylphenyl is in particular tolyl. $R_6$ defined as phenylalkyl is in particular benzyl.

Illustrative examples of 1,3-dicarbonyl compounds of the above formula are acetylacetone, butanoylacetone, heptanoylacetone, stearoylacetone, palmitoylacetone, lauroylacetone, 7-tert-nonylthioheptane-2,4-dion, benzoylacetone, dibenzoylmethane, lauroylbenzoylmethane, palmitoylbenzoylmethane, stearoylbenzoylmethane, isooctylbenzoylmethane, 5-hydroxycapronylbenzoylmethane, tribenzoylmethane, bis (4-methylbenzoyl)methane, benzoyl-p-chlorobenzoylmethane, bis(2-hydroxybenzoyl)methane, 4-methoxybenzoylbenzoylmethane, bis(4-methoxybenzoyl) methane, 1-benzoyl-1-acetyl-nonane, benzoylacetylphenylmethane, stearoyl-4-methoxybenzoylmethane, bis(4-tert-butylbenzoyl)methane, benzoylformylmethane, benzoylphenylacetylmethane, bis (cyclohexanoyl)methane, di(pivaloyl)methane, methyl acetate, ethyl acetate, hexyl acetate, octyl acetate, dodecyl acetate or octadecyl acetate, ethyl benzoyl acetate, butyl benzoyl acetate, 2-ethylhexyl benzyol acetate, dodecyl benzoyl acetate or octadecyl benzoyl acetate, ethyl stearoyl acetate, propyl stearoyl acetate, butyl stearoyl acetate, hexyl stearoyl acetate or octyl stearoyl acetate, as well as butandiol-1,4-acetoacetic ester or thiodiglycol acetoacetic ester or trisacetylacetoxyethyleneisocyanurate and dehydracetic acid. Further examples are the zinc salts, calcium salts, magnesium salts, barium salts and aluminium salts or complexes of the cited β-keto esters and β-diketones, as well as of the acetoacetic acid and benzoyl acetoacetic acid.

Those 1,3-diketo compounds of the above formula are preferred, wherein $R'_1$ is $C_1-C_{18}$alkyl, phenyl, phenyl which is substituted by OH, methyl or methoxy, $C_7-C_{10}$phenylalkyl or cyclohexyl, $R'_2$ is hydrogen and $R'_3$ has one of the meanings cited for $R'_1$.

The 1,3-diketo compounds can be used in amounts of typically 0.01 to 10, conveniently of 0.01 to 3 and, preferably, of 0.01 to 2 parts by weight, based on 100 parts by weight of PVC. In special cases, amounts of up to 20 parts by weight can also be convenient.

Suitable antioxidants are for example:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymnethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis2,6-dimethyl4-hydroxyphenyl) disulfide.

6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'- methylenebis(2,6-di-tert-butylphenol), 4,4'-methylenebis(6-tertbutyl-2-methylphenol), 1,1-bis(5-tert-butyl-4-hydroxy-2-methylphenyl)butane, 2,6-bis(3tert-butyl-5-methyl-2-hydroxybenzyl)-4-methylphenol, 1,1,3-tris(5-tert-butyl-4-hydroxy2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3tert-butyl-4-hydroxy-5-methyl-phenyl) dicyclopentadiene, bis[2-(3'-tert-butyl-2'-hydroxy5'-methylbenzyl)-6-tert-butyl-4-methylphenyl]terephthalate, 1,1-bis(3,5-dimethyl-2hydroxyphenyl)butane, 2,2-bis(3,5-di-tert-butyl-4-hydroxyphenyl)propane, 2,2-bis(5-tertbutyl-4-hydroxy-2-methylphenyl)-4-n-dodecylmercaptobutane, 1,1,5,5-tetra(5-tert-butyl4-hydroxy-2-methylphenyl) pentane.

7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bis (octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylinercapto-4,6-bis(3,5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3 ,5-dicyclohexyl-4-hydroxybenzyl)isocyanurate.

11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydro xyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl) propionic acid, e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

18. Ascorbic acid (vitamin C)

19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylamino-phenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octylphenothiazines, N-allylphenothiazine, N,N,N',N'-tetraphenyl-1,4-diaminobut-2-ene, N,N-bis(2,2,6,6-tetramethyl-piperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

It is also possible to use a mixture of antioxidants of different structure.

The antioxidants can be used, for example, in amounts of 0.01 to 10, conveniently of 0.1 to 10 and, preferably, of 0.1 to 5 parts by weight, based on 100 parts by weight of PVC.

Suitable UV absorbers and light stabilisers are, for example:

1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'di-tert-amyl-2'-hydroxyphenyl) benzotriazole, 2-(3',5'-bis($\alpha,\alpha$-dimethylbenzyl)-2'hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$, where R=3'-tert-butyl-4'-hydroxy-5'-2H-benzotriazol-2-ylphenyl.

2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl) resorcinol, benzoyl, resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl $\alpha$-cyano-$\beta,\beta$-diphenylacrylate, isooctyl $\alpha$-cyano-$\beta,\beta$-diphenylacrylate, methyl $\alpha$-carbomethoxycinnamate, methyl $\alpha$-cyano-$\beta$-methyl-p-methoxycinnamate, butyl $\alpha$-cyano-$\beta$-methyl-p-methoxy-cinnamate, methyl $\alpha$-carbomethoxy-p-methoxycinnamate and N-($\beta$-carbomethoxy-$\beta$-cyanovinyl)-2-methylindoline.

5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octyl-amino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5] decane, a reaction product of 7,7,9,9-tetramethyl-2-cycloundecyl-1-oxa-3,8-diaza-4-oxospiro[4,5]decane und epichlorohydrin.

7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'ethyloxanilide, N,N'-bis(3-dimethylaminopropyl) oxamide, 2-ethoxy-5-tert-butyl-2'-ethoxanilide and the mixture thereof with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

8. 2-(2-Hydroxyphenyl)-1,3,5-triazines, for example 2,4,6-tris(2-hydroxy-4-octyloxyphenyl)-1,3,5-triazine, 2-(2- hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

Suitable further additives are:

Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

Phosphites and Phosphonites

Suitable are organic phosphites of the general formula P(OR)$_3$, wherein the radicals R are identical or different alkyl, alktenyl, aryl or aralkyl radicals. Preferred organic phosphites are those of formulae

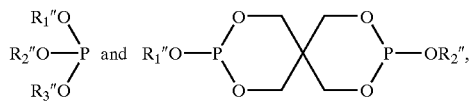

wherein R$_1$", R$_2$" and R$_3$" are identical or different and are C$_6$–C$_{18}$alkyl, C$_6$–C$_{18}$alkenyl, a substituted or unsubstituted phenyl radical, or C$_5$–C$_7$cycloalkyl.

If R$_1$", R$_2$" and R$_3$" are defined as C$_6$–C$_{18}$alkyl, then they are, for example, n-hexyl, n-octyl, n-nonyl, decyl, dodecyl, tetradecyl, hexadecyl or octadecyl. Alkyl groups containing 8 to 18 carbon atoms are preferred.

R$_1$", R$_2$" and R$_3$" defined as substituted phenyl are typically tolyl, ethylphenyl, xylyl, cumyl, cymyl, cresyl, 4-methoxyphenyl, 2,4-dimethoxyphenyl, ethoxyphenyl, butoxyphenyl, p-n-octylphenyl, p-n-nonylphenyl or p-n-dodecylphenyl.

Particularly suitable phosphites are trioctyl, tridecyl, tridodecyl, tritetradecyl, tristearyl, trioleyl, triphenyl, tricresyl, tris-p-nonylphenyl or tricyclohexyl phosphite, and particularly preferred are the aryl dialkyl and the alkyl diaryl phosphites, typically phenyldipropylene glycol phosphites, tetraalkyl(bisphenol A) phosphites, phenyldidecyl phosphite, (2,4-di-tert-butylphenyl)didodecyl phosphite, (2,6-di-tert-butylphenyl)didodecyl phosphite and the dialkyl- and diarylpentaerythritol diphosphites, such as distearylpentaerythritol diphosphite, as well as non-stoichiometric triaryl phosphites, such as those of the (H$_{19}$C$_9$—C$_6$H$_4$)O$_{1.5}$P(OC$_{12/13}$H$_{25/27}$)$_{1.5}$ composition.

Phosphites are typically triphenyl phosphite, diphenyl alkyl phosphites, phenyl dialkyl phosphites, tris (nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,6-di-tert-butyl-4-methylphenyl) pentaerythritol diphosphite, diisodecyloxypentaerythritol diphosphite, bis(2,4-di-tert-butyl-6-methylphenyl) pentaerythritol diphosphite, bis(2,4,6-tris(tert-butylphenyl) pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyldibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

Preferred organic phosphites are distearyl pentaerythritol diphosphite, trisnonylphenyl phosphite and phenyldidecyl phosphite.

The organic phosphites can be used in amounts of typically 0.01 to 10, conveniently of 0.05 to 5 and, preferably, of 0.1 to 3 parts by weight, based on 100 parts of PVC.

Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-bexadecyl-N-octadecylhydroxylamine, N-heptadecyl-N-octadecylhydroxylamine, N,N-dialkylhydroxylamine derived from hydrogenated tallow amine.

Nitrons, for example N-benzyl-α-phenylnitron, N-ethyl-α-methylnitron, N-octyl-α-heptylnitron, N-lauryl-α-undecylnitron, N-tetradecyl-α-tridecylnitron, N-hexadecyl-α-pentadecylnitron, N-octadecyl-α-heptadecylnitron, N-hexadecyl-α-heptadecylnitron, N-octadecyl-α-pentadecylnitron, N-heptadecyl-α-heptadecylnitron, N-octadecyl-α-hexadecylnitron, nitrons derived from N,N-dialkylhydroxylamine derived from hydrogenated tallow amine.

Thiosynergists, for example dilauryl thiodipropionate or distearyl thiodipropionate.

Peroxide scavengers, for example esters of β-thiodipropionic acid, typically the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

Polyamide stabilisers, for example copper salts in combination with iodides and/or phosphorus compounds and salts of divalent manganese.

Basic co-stabilisers, for example melamine, polyvinylpyrrolidone, dicyandiamide, triallyl cyanurate, urea derivatives, hydrazine derivatives, amines, polyamides, polyurethanes, antimony pyrocatecholate or tin pyrocatecholate.

Nucleating agents, for example inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. diphenylacetic acid, sodium succinate or sodium benzoate; polymeric compounds such as ionic copolymers ("ionomers").

Fillers and reinforcing agents, for example, calcium carbonate, silicates, glass fibres, glass beads, asbestos, talcum, kaolin, mica, barium sulfate, metal oxides and metal hydroxides, carbon black, graphite, wood flour, or flours or fibers of other natural products, synthetic fibers.

Benzofuranones and indolinones, for example those disclosed in U.S. Pat. Nos. 4,325,863, 4,338,244, 5,175,312, 5,216,052, 5,252,643, DE-A-4 316 611, DE-A-4 316 622, DE-A-4 316 876, EP-A-0 589 839 or EP-A-0 591 102 or 3-[4-(2-acetoxyethoxy)phenyl]-5,7-di-tert-butylbenzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]-phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one.

Other additives, for example lubricants, emulsifiers, pigments, rheology additives, catalysts, flow-control agents, fluorescent whitening agents, flame retarding agents, antistatic agents and blowing agents.

Suitable lubricants are, for example: Higher fatty acids or the alkali metal salts and alkaline earth metal salts thereof, as well as montan wax, fatty acid ester, complex ester, PE waxes, amide waxes, paraffins, glycerol esters or fatty ketones. Lubricants which can be used are also described in "Plastics Additives", edited by R. Gächter and H. Müller, Hanser Verlag, 3rd Edition, 1990, chapter 6, pages 423–480 and in "Kunststoff Handbuch PVC" 2/1, 20. Edition, 1986, pp. 570–595.

Further suitable metal-free stabilisers are typically β-naphthol, hydroxydiphenylamine, α-phenylindole, β-aminocrotonates and pyrroles, such as those described, inter alia, in EP-A-465405.

Suitable polyols are, for example:
pentaerythritol, dipentaerythritol, tripentaerythritol, bistrimethylolpropane, bis-tri methylolethane, trismethylolpropane, sorbitol, maltitol, isomaltitol, lactitol, lycasin, mannitol, lactose, leucrose, tris (hydroxyethyl)isocyanurate, palatinite, tetramethylolcyclohexanol, tetramethylolcyclopentanol, tetramethylolcyclopyranol, glycerol, diglycerol, polyglycerol or 1-0-α-D-glycopyranosyl-D-mannitol dihydrate. Among these, the disaccharide alcohols are preferred.

The polyols can be used in amounts of typically 0.01 to 20, conveniently of 0.1 to 20 and, preferably, of 0.1 to 10 parts by weight, based on 100 parts by weight of PVC.

Suitable compounds of the hydrotalcite series are the naturally occuring minerals as well as synthetically produced compounds. It is preferred to use additional hydrotalcites in the compositions of this invention because these compounds can enhance the stabilisation synergistically.

Compounds of the hydrotalcite series can be represented by the general formula I $$M^{2+}_{1-x} \cdot M^{3+}_x \cdot (OH)_2 \cdot (A^{n-})_{x/n} \cdot mH_2O, \quad (I)$$

wherein
$M^{2+}$=Mg, Ca, Sr, Zn, Sn and/or Ni,
$M^{3+}$=Al, B or Bi,
$A^n$ is an anion of valency n,
n is a number from 1 to 4,
x is a number from 0 to 0.5,
m is a number from 0 to 2.
Preference is given to:
$A^n$=$OH^-$, $Cl^-$, $Br^-$, $I^-$, $ClO_4^-$, $HCO_3^-$, $CH_3COO^-$, $C_6H_5COO^-$, $CO_3^{2-}$, $SO_4^{2-}$,

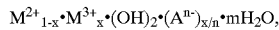

$(CHOHCOO)_2^{2-}$, $(CHOH)_4CH_2OHCOO^-$, $C_2H_4(COO)_2^{2-}$, $(CH_2COO)_2^{3-}$, $CH_3CHOHCOO^-$, $SiO_3^{2-}$, $SiO_4^{4-}$, $Fe(CN)_6^{3-}$, $Fe(CN)_6^{4-}$ or $HPO_4^{2-}$; further examples are given in DE 41 06 403.

Other hydrotalcites which can expediently be used are compounds of the general formula Ia $$M_x^{2+} Al_2(OH)_{2x+6nz}(A^{n-})_2 \cdot mH_2O \quad (Ia),$$

in which formula Ia $M^{2+}$ is at least one metal of the series of Mg and Zn, preferably Mg, $A^{n-}$ is an anion, typically of the series of

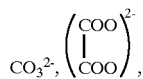

$OH^-$ und $S^{2-}$, wherein n is the valency of the anion, m is a positive number, preferably from 0.5 to 5, and x and z are positive numbers, x preferably being a number from 2 to 6, and z being less than 2.

Preferred compounds are those of the hydrotalcite series of the general formula I, $$M^{2+}_{1-x} \cdot M^{3+}_x \cdot (OH)_2 \cdot (A^{n-})_{x/n} \cdot mH_2O, \quad (I)$$

wherein $M^{2+}$ is Mg or a solid solution of Mg and Zn, $A^{n-}$ is $CO_3^{2-}$, x is a number from 0 to 0.5, and m is a number from 0 to 2.

Very particularly preferred hydrotalcites are those of formulae $Al_2O_3 \cdot 6MgO \cdot CO_2 \cdot 12H_2O$, $Mg_{4.5}Al_2(OH)_{13} \cdot CO_3 \cdot 3.5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ or $ZnO \cdot 3MgO \cdot Al_2O_3 \cdot CO_2 \cdot 5-6H_2O$.

The hydrotalcites can be used in amounts of typically 0.1 to 20, conveniently of 0.1 to 10 and, preferably, of 0.1 to 5 parts by weight, based on 100 parts by weight of PVC.

Dawsonites can also be added to the PVC and in the same amounts as the zeolites. These dawsonites are aluminium carbonates of formula Na—(or K— or Li—)[AL(OH)$_2$ CO$_3$]·n H$_2$O. Kenyaites, kanemites and magadiites are also suitable, e.g. a magadiite of formula Na$_2$Si$_{14}$O$_{29}$·n H$_2$O or Na$_2$Si$_8$O$_{17}$·n H$_2$O, wherein n is a number from 0–30; or a kenyaite of formula Na$_2$Si$_{22}$O$_{45}$·n H$_2$O, wherein n is a number from 0 to 30; or a kanemite of formula Na$_2$Si$_2$O$_5$·n H$_2$O, NaHSi$_2$O$_5$·n H$_2$O or Na$_2$Si$_4$O$_9$·n H$_2$O, wherein n is a number from 0 to 30.

The magadiites, kenyaites or kanemites which can be used may be naturally occuring minerals or synthetically produced compounds. Processes for the preparation of such compounds are disclosed, inter alia, in EP 0 472 144, EP 0 615 955, EP 0 615 956, EP 0 627 383 and DE 41 07 955.

Mixtures of the cited inorganic costabilisers can likewise be advantageously used. Without altering the essence of the invention, minor amounts of zeolite components resulting from synthesis can also be present (about 10%), typically zeolite A or cl inoptilolite.

Preferred polymer compositions are those comprising (a) PVC or the recyclate thereof, (b) at least one P type zeolite, (c) at least one organic zinc compound, and/or (d) at least one organotin compound of the above-described formulae I to VII.

Polymer compositions comprising as component (b) zeolite MAP are particularly preferred.

A stabilised PVC-containing polymer is also preferred which additionally contains an epoxide and/or an organic calcium compound and/or a β-diketone or a β-keto ester.

A stabilised PVC-containing polymer is also preferred which additionally contains a phenolic antioxidant.

All combinations can contain additional lubricants.

The invention also relates to a stabiliser mixture comprising the components (b), (c) and/or (d) described at the outset.

The individual components of the mixture all have the preferred meanings stated above, and the stabiliser mixture can also contain the additional components described above.

Together with conventional additives, the stabiliser mixture can also be moulded before the actual use, e.g. to granules or to an extrudate or paste.

The invention also relates to the use of the stabiliser mixture described above, which may also be in the form of granules, extrudate or paste as well as together with lubricants (so-called one-pack), for stabilising a halogen-containing polymer or polymer recyclate. The preferred meanings stated above also apply to the individual stabilisers and to the halogen-containing polymer itself, and it is also possible to use one of the additional components described above.

The novel polymer composition can be prepared in known manner by mixing the cited stabilisers and optional further additives with the halogen-containing polymer using known apparatus such as mixers, kneaders, extruders, mills and the like. The stabilisers can be added singly or in admixture or also in the form of a masterbatch. Accordingly, the invention also relates to a process for the preparation of a stabilised halogen-containing polymer, which comprises mixing the components (b), (c) and/or (d) in accordance with claim 1 as well as optional further additives with the PVC, using apparatus such as calenders, mixers, kneaders,iextruders and the like.

The polymer compositions stabilised according to the invention can be brought into the desired shape in known manner. Such methods typically include calendering, extruding, injection moulding, sintering or spinning, as well as extrusion blow moulding or processing by the plastisol process. The polymer compositions can also be processed to foams.

The invention also relates to the use of the stabilised polymer compositions for the preparation of mouldings which can be prepared from halogen-containing polymer. The polymer compositions of this invention are suitable for semi-rigid and flexible formulations, in particular in the form of flexible formulations for wire sheaths, cable insulations, which are particularly preferred. In the form of semi-rigid formulations, the novel polymer compositions are particularly suitable for decorative films, foams, agricultural sheeting, tubes, sealing profiles, office films, extruded profiles and sheets, flooring films and sheets, coating materials and artificial leather as well as for crash-pad films (automobiles).

In the form of rigid formulations, the novel polymer compositions are particularly suitable for hollow articles (bottles), packaging films (thermoforming forms), blown films, crash-pad films (automobiles), tubes, foams, heavy profiles (window frames), light-wall profiles, building profiles, sidings, fittings, and apparatus housings (computers and domestic appliances) as well as other injection moulding articles.

Examples of the use of the polymer compositions stabilised according to the invention as plastisols are artificial leather, flooring, textile coatings, wall coverings, coil coatings and automotive underseal.

Examples of sintered applications of the polymer compositions stabilised according to this invention are slush, slush mould and coil coatings.

Also preferred are polymer compositions containing additional substances selected from the group consisting of reinforcing agents, antioxidants, polyols, hydrotalcites, dawsonites, organic phosphites, dihydropyridines, sterically hindered amines (HALS), light stabilisers, UV absorbers, lubricants, fatty acid esters, paraffins, blowing agents, fluorescent whitening agents, pigments, flame retardants, antistatic agents, β-aminocrotonates, pyrroles, naphthols, hydroxydiphenylamines, disaccharide alcohols, phenylindoles, phosphates, thiophosphates, gelling assistants, peroxide scavenging compounds, modifiers and further sequestrants for Lewis acids.

Particularly preferred are also polymer compositions which additionally contain a phenolic antioxidant.

Polymer compositions which additionally contain fillers, preferably chalk, are also particularly preferred.

Likewise preferred are polymer compositions which additionally contain at least one additive from the group of the disaccharide alcohols, organic phosphites, zeolites, hydrotalcites, dawsonites, aminocrotonates, polyols, diketones, pyrroles, β-naphthols or the mono-, oligo- or polymeric dihydropyridines.

Polymer compositions which additionally contain at least one additives from the group of the organic phosphites, dawsdnites and hydrotalcites are also preferred.

Also preferred are polymer compositions which additionally contain a sterically hindered amine, preferably 0.01–5 parts per 100 parts of PVC.

The following Examples illustrate the invention in more detail without, however, limiting it in any way. Here as well as in the remainder of the description, parts and percentages are by weight, unless otherwise stated. The yellowness index (YI) is determined in accordance with ASTM D 1925-70, and the transparency behaviour (contrast ratio CR) is determined in accordance with ASTM 2805-70 and 589-65.

EXAMPLES

Continuous Rolling Test

The PVC mixture is rolled at 180° C. on a roll mill having a gap width of 0.5 mm. A sample is taken every 5 minutes, the yellowness index (YI) of which is determined after cooling.

The following Table I shows the stabiliser activity of zeolite P.

TABLE I

Continuous rolling test

| Mixture Example | 7 | 8 |
|---|---|---|
| PVC K value 71[1] | 100 | 100 |
| dioctyl phthalate | 18 | 18 |
| epox. soybean oil | 2 | 2 |
| calcium stearate | 0.2 | 0.2 |
| zinc stearate | 0.85 | 0.85 |
| Irganox ® 1076[2] | 0.10 | 0.1 |
| zeolite P[4] | — | 0.9 |
| YI after 30 min | >>40 | 32 |

[1]Evipol SH 7020 (S-PVC, K value 71)
[2]Octadecyl-3-(3,5-di-tert-butyl-4-hydroxyphenyl)propionate
[4]Sample ex Degussa, composition $Na_2O.Al_2O_3.2\ SiO_2.3\ H_2O$
interplanar spacing:

| d value | intensity |
|---|---|
| 12.4 | very weak |
| 8.7 | very weak |
| 7.1 | very strong |
| 5.02 | strong |
| 4.09 | strong |
| 3.7 | very weak |
| 3.34 | very weak |
| 3.28 | very weak |
| 3.20 | strong |
| 3.17 | very strong |
| 2.97 | very weak |
| 2.90 | medium |
| 2.69 | strong |
| 2.61 | very weak |
| 2.36 | weak |
| 1.96 | medium |
| 1.78 | weak |
| 1.72 | weak |

A PVC composition is prepared by mixing the individual components according to the following Tables (amounts in parts by weight).

The components are homogenised for 5 minutes on a mixer roller at 170–190° C. and rolled to a 0.1–0,5 mm film.

The stability of the samples is determined with the following test: The PVC mixture is rolled at 180° C. on a roll mill having a gap width of 0.3 mm.

Pressed Sheet

Several rolled sheets homogenised as above are moulded for 3 minutes at 180° to a 2 mm pressed sheet, the yellowness index of which is measured after cooling (Table II).

TABLE II

Yellowness Index Pressed Sheet

| Mixture Example | 1 | 2 |
|---|---|---|
| PVC K value 71[1] | 100 | 100 |
| dioctyl phthalate | 18 | 18 |
| epox. soybean oil | 2 | 2 |
| calcium stearate | 0.2 | 0.2 |
| zinc stearate | 0.85 | 0.85 |
| Irganox ® 1076[2] | 0.10 | 0.1 |
| Wessalith ® P[3] | 1.5 | — |
| zeolite P[4] | — | 1.5 |
| YI of the pressed sheet | 63.5 | 57.2 |

[1]Evipol SH 7020 (S-PVC, K value 71)
[2]Octadecyl-3-(3,5-di-tert-butyl-4-hydroxyphenyl)propionate
[3]4A-zeolite, supplied by Degussa, Na form
[4]as described, sample ex Degussa The Example shows the enhanced stabiliser activity of zeolite P in comparison with Wessalith P.

Static Heat Test

The long-term stability is determined with a static heat test ("stat. h.") according to DIN 53381, the sample being stored at 190° C. in a test oven and the yellowness index being determined after a specific time. Lower yellowness indices signify better stabilisation.

Results

TABLE III

Static heat test, thickness 0.4 mm

| Mixture Example | 3 | 4 |
|---|---|---|
| PVC K value 71[1] | 100 | 100 |
| dioctyl phthalate | 18 | 18 |
| epox. soybean oil | 2 | 2 |
| calcium stearate | 0.2 | 0.2 |
| zinc stearate | 0.85 | 0.85 |
| Irganox ® 1076[2] | 0.10 | 0.1 |
| Wessalith ® P[3] | 0.9 | — |
| zeolite P[4] | — | 0.9 |
| YI after 10 min | 17.1 | 16 |
| YI after 15 min | 24.1 | 22.1 |
| YI after 20 min | 32.6 | 24.8 |
| YI after 25 min | 35 | 25.8 |

[1]Evipol SH 7020 (S-PVC, K value 71)
[2]Octadecyl-3-(3,5-di-tert-butyl-4-hydroxyphenyl)propionate
[3]4A-zeolite, supplied by Degussa, Na form
[4]as described, ex Degussa The Example shows the enhanced stabiliser activity of zeolite P in comparison with Wessalith P.

TABLE IV

Static heat test, as described above

| Mixture Example | 5 | 6 |
|---|---|---|
| PVC K value 71[1] | 100 | 100 |
| dioctyl phthalate | 18 | 18 |
| epox. soybean oil | 2 | 2 |
| calcium stearate | 0.2 | 0.2 |
| zinc stearate | 0.85 | 0.85 |
| Irganox ® 1076[2] | 0.10 | 0.1 |
| Wessalith ® P[3] | 1.5 | — |
| zeolite P[4] | — | 1.5 |
| YI after 10 min | 31.5 | 21.6 |
| YI after 15 min | 42.8 | 27.2 |
| YI after 20 min | 51.8 | 31.7 |

[1]Evipol SH 7020 (S-PVC, K value 71)
[2]Octadecyl-3-(3,5-di-tert-butyl-4-hydroxyphenyl)propionate
[3]4A-zeolite, supplied by Degussa, Na form
[4]as described, ex Degussa The Example shows the enhanced stabiliser activity of zeolite P in comparison with Wessalith P.

What is claimed is:

1. A composition, comprising
   (a) a halogen-containing polymer or a recyclate thereof;
   (b) at least one zeolite in the form of alkali metal zeolite, with the exception of zeolite A, $Na_{12}Al_{12}Si_{12}O_{48}.27\ H_2O$ and clinoptilolite $Na_6Al_6Si_{30}O_{72}.2\ H_2O$, and at least one organic zinc, aluminum or rare earth compound.

2. A composition according to claim 1, wherein component (a) is PVC or a recyclate thereof.

3. A composition according to claim 1, wherein component (a) is PVC or a recyclate thereof, and component (c) is from 0.001 to 5.0 parts per 100 parts of PVC of an organic zinc compound.

4. A composition according to claim 1, wherein component (b) is at least one zeolite in the form of sodium, potassium and/or lithium, with the exception of zeolite A, $Na_{12}Al_{12}Si_{12}O_{48}.27\ H_2O$ and clinoptilolite $Na_6Al_6Si_{30}O_{72}.2\ H_2O$.

5. A composition according to claim 1, wherein component (b) is at least one zeolite of formula $$M_2O \cdot Al_2O_3 \cdot x\ SiO_2 \cdot y\ H_2O \qquad (I)$$

wherein M is Na, K or Li, x is 2 to 12, and y is 1 to 15, with the exception of zeolite A, $Na_{12}Al_{12}Si_{12}O_{48} \cdot 27\ H_2O$ and clinoptilolite $Na_6Al_6Si_{30}O_{72} \cdot 2\ H_2O$.

6. A composition according to claim 1, wherein component (b) is a zeolite of formula I according to claim 4 having a pore diameter of 3 to 9 Å.

7. A composition according to claim 1, wherein component (b) is a zeolite of formula I which is of foliated or cubical crystal habit.

8. A composition according to claim 1, wherein in component (b) M is Na or K, x is 1 to 10, and y is 2 to 12.

9. A composition according to claim 1, wherein component (b) is zeolite P, i.e. in formula I M is Na, x is 1 to 5, and y is 3.5 to 6.

10. A composition according to claim 1, which additionally comprises an epoxide.

11. A composition according to claim 1, which additionally comprises an organic calcium compound.

12. A composition according to claim 1, which additionally comprises a phenolic antioxidant.

13. A process for the preparation of a stabilised halogen-containing polymer or polymer recyclate, which comprises mixing a stabiliser mixture as claimed in claim 1 as such or in the form of its individual components with a halogen-containing polymer, using apparatus such as calenders, mixers, kneaders and extruders.

14. A composition according to claim 1, which additionally comprises substances selected from the group consisting of fillers and reinforcing agents, antioxidants, polyols, hydrotalcites, dawsonites, organic phosphites, 1,3-diketo compounds, dihydropyridines, sterically hindered amines (HALS), light stabilisers, UV absorbers, lubricants, fatty acid esters, paraffins, blowing agents, fluorescent whitening agents, pigments, flame retardants, antistatic agents, β-aminocrotonates, pyrroles, naphthols, hydroxydiphenylamines, disaccharide alcohols, phenylindoles, phosphates, thiophosphates, gelling assistants, peroxide scavenging compounds, modifiers and further sequestrants for Lewis acids.

* * * * *